United States Patent [19]

Kania

[11] Patent Number: 4,890,128
[45] Date of Patent: Dec. 26, 1989

[54] SHOCK ABSORBER FOR A BOW MOUNTED CAMERA

[76] Inventor: Bruce Kania, 717 S. 14th St., Bozeman, Mont. 59715

[21] Appl. No.: 261,733

[22] Filed: Oct. 24, 1988

[51] Int. Cl.$^4$ .............................................. G03B 29/00
[52] U.S. Cl. ..................................................... 354/76
[58] Field of Search ........................... 354/76, 81, 293

[56] References Cited

U.S. PATENT DOCUMENTS 3,062,114 11/1962 Palos .................................. 354/76 X
4,296,725 10/1981 Broderick ........................ 354/76 X
4,643,159 2/1987 Ryan ................................. 354/76 X Primary Examiner—Michael L. Gellner
Attorney, Agent, or Firm—Richard C. Conover

[57] ABSTRACT

This invention relates to a shock absorption device for absorbing recoil shock when a camera is mounted to an archery bow. The present invention includes a first mechanism which operates to absorb shock in a generally horizontal plane when the shooting device is being used for shooting and a second mechanism which operates to absorb shock in a generally vertical direction when the shooting device is being used. The two mechanisms operate independently of one another. The mechanism operating in the horizontal plane uses first and second planar members which have polished, greased, flat surfaces abutting each other in a mating relation which members are held together with a wide elastic band tightly encasing the perimeter of the two members. The two members slide relative to one another when the shock force is applied, and after the shock force subsides, the elastic band restores the two members to their normal static resting position. The second absorption mechanism includes a member connected to the bow and another member connected to the camera. The two members are hinged together and are positioned one above the other with a foam-like material sandwiched between them. This mechanism absorbs shock forces which occur in a general vertical direction when the bow is being used.

6 Claims, 1 Drawing Sheet

SHOCK ABSORBER FOR A BOW MOUNTED CAMERA

BACKGROUND OF THE INVENTION

This invention relates to a new and useful improvement in shock absorption devices which absorb recoil shock forces acting on a camera mounted to a shooting device and, in particular, to a device for absorbing shock when a camera is mounted to an archery bow.

When an arrow is shot from a bow, the bow experiences a normal recoil force which moves the bow in the hands of a user. As a result, a picture taken by a camera mounted to the bow will be degraded by the motion of the bow unless the camera is isolated from these recoil forces.

Apparatus for mounting a camera rigidly to a bow are known. See, for example, U.S. Pat. No. 4,643,159 to Ryan.

An improvement of a mounting device having shock absorption capability is shown in U.S. Pat. No. 4,296,725 to Broderick. Here, a camera is encased in a padded case which is mounted to the bow. The padded case is used to absorb the recoil so that jarring or impact will not damage the camera. A secondary feature is that some of the recoil is absorbed so that better pictures may be taken.

U.S. Pat. No. 3,062,114 to Palos illustrates another method for isolating camera motion when a camera is mounted to a shooting device, here a rifle. The Palos patent describes a mounting where a coil spring is mounted in the direction of recoil to absorb the recoil.

A need exists for a shock absorption device which will absorb shock not only in the direction of recoil but in other directions as well.

SUMMARY OF INVENTION

The present invention comprises two different mechanisms to isolate a camera from shock: one mechanism operating in a generally horizontal plane when the shooting device is being used for shooting and a second mechanism operating in a generally vertical direction when the shooting device is being used. The two mechanisms operate independently of one another but absorb shock in the horizontal as well as the vertical directions.

The mechanism operating in the horizontal plane uses first and second members which have polished, greased, flat surfaces abutting each other on a mating plane. In this configuration, the two members are free to slide in any direction parallel with the mating plane. A wide elastic band tightly encases the perimeter of the two members and is tightly clamped or held on the perimeter of each member. The first member is rigidly mounted to the shooting device and the second member is connected to the camera. When a generally horizontal shock impulse force is transmitted by the bow, the first member moves relative to the second member as a consequence of the inertia of the camera. After the impulse force subsides, the elastic band restores the two members to their normal static resting position with the second member again positioned directly over the first member. Thus, the camera is isolated from sudden movement caused by recoil.

A second shock absorption mechanism is provided between the second member and the camera for absorbing shock in the vertical direction. This mechanism includes third and fourth members which are folded over one another, hinged together, and separated by a resilient foam material. The third member is rigidly mounted to the second member and the fourth member is rigidly mounted to the camera. As forces suddenly move the camera in a vertical direction, the resilient foam material allows the camera's inertia to stabilize the camera.

A camera mounted to the bow with the present invention can be used to take steady pictures before, during, and after an archer releases an arrow from a bow. This shock absorption mechanism effectively isolates the camera from both horizontal and vertical shock forces.

BRIEF DESCRIPTION OF THE DRAWINGS

In order that the invention may be clearly understood and readily carried into effect, preferred embodiments of the invention will now be described, by way of example only, with reference to the accompanying drawings wherein.

DESCRIPTION OF A PREFERRED EMBODIMENT

Figure 1:
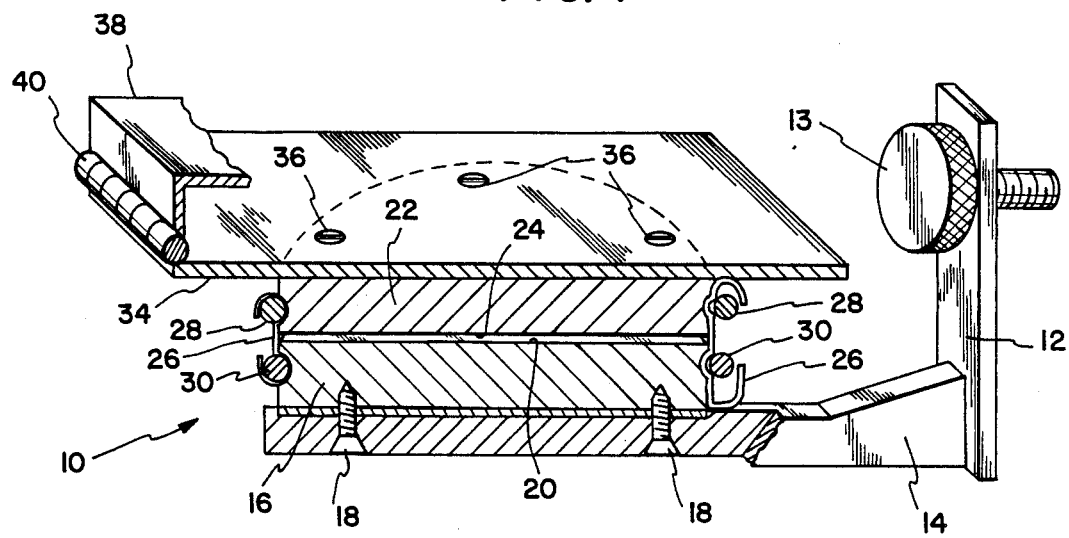
FIG. 1 is a perspective view of a shock absorption mechanism of the present invention for absorbing shock in a generally horizontal direction, this view being partially in section, with portions exploded for reasons of clarity.

A device 10 for absorbing shock in a generally horizontal plane when a bow is being used for shooting in a particular direction as shown in FIG. 1. The device 10 includes a camera mounting plate 12 mounted to a bow (not shown) with a bolt 13 which screws into the threaded sling mounting plate (not shown) of the bow. The camera mounting plate 12 includes a camera support member 14 which extends outwardly from the camera mounting plate 12 in the direction of shooting. This camera support member is rigidly secured to a first member 16 with mounting screws 18. In a preferred embodiment, the first member 16 is disc-shaped and is constructed of a solid metallic material having a machined and polished flat surface 20 on the upper side thereof as shown in FIG. 1. A second member 22 is sized and shaped to conform to the first member 16. This second member 22, in a preferred embodiment, is constructed of a solid metallic material having a lower, machined and polished, flat surface 24 as shown in FIG. 1. The machined surface 24 is positioned above machined surface 20 and is positioned to be in an abutting and slidable relation with machined surface 20. For purposes of description, the plane of abutment shall be referred to hereinafter as the "mating plane". Further, in a preferred embodiment, a lubricant such as grease is placed between the two members 16 and 22 to reduce friction when one member slides relative to the other.

The first and second members are resiliently maintained in the foresaid relative position with a wide elastic band 26. This elastic band 26 encases the mating plane between the two machined surfaces 20 and 24. The elastic band 26 is held in position on the second member 22 with an "O" ring 28. Further, the elastic band 26 is secured to the first member 16 with a second "O" ring 30. It is contemplated that other means could be used for securing the elastic band to the first and second members such as adhesives, heat binding, and other clamping means.

As can be appreciated, as the first and second members are forced to slide on the mating plane relative to one another and then the force removed, the elastic band 26 will act to restore the first and second members to their original normal resting position as shown in FIG. 1. As will be subsequently described, the device 10 provides a shock absorption device providing shock absorption capability in a generally horizontal plane as the shooting device is being used.

Figure 2:
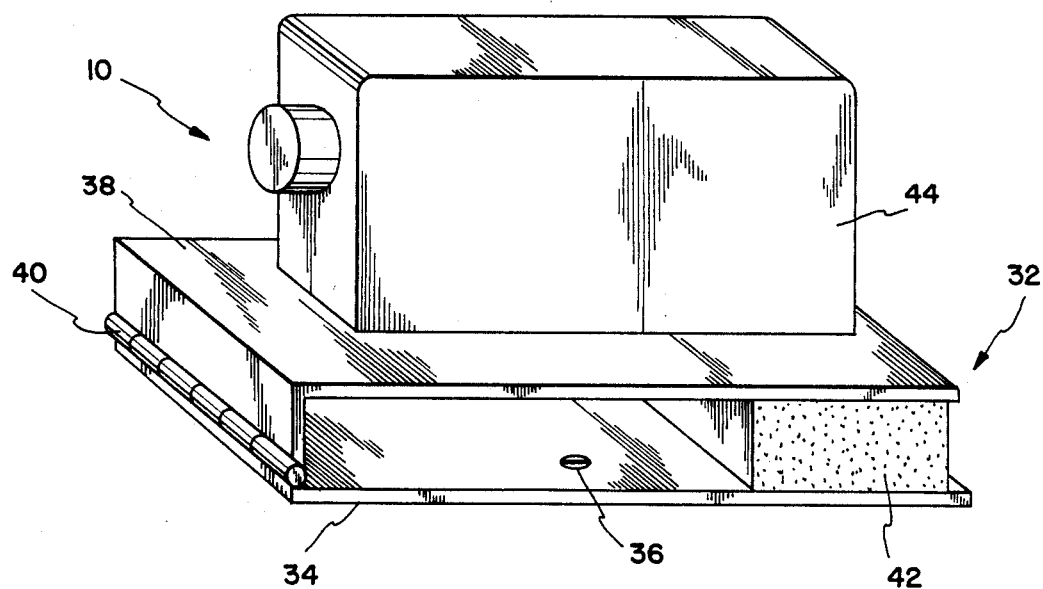
FIG. 2 is a perspective view of a shock absorption mechanism of the present invention used for absorbing shock in the vertical direction.

A device 32 for absorbing shock, in a generally vertical direction when the shooting device is being used, is shown in FIG. 2. This device includes a third member 34 which is secured to the second member 22 with screws 36 as shown in FIG. 1. A fourth member 38 is also provided. In a preferred embodiment, the third member is a planar member as shown in FIG. 2. The fourth member is also a planar member with an "L" shaped cross-section. One leg of this "L" shaped member is secured to a hinge 40 which hinge is also secured to the planar third member 34. Thus, the third member 34 and fourth member 38 are hingedly connected together. The hinge 40 has a hinge axis which, in a preferred embodiment, is parallel to the mating plane and perpendicular to the direction of shooting. The other leg of the "L" is positioned to extend generally over the third member 34 as shown in FIGS. 1 and 2. A shock absorption material 42 is positioned between the third member 34 and fourth member 38. This shock absorption material 42, in a preferred embodiment, is a foam rubber material which is adhesively attached to both third member 34 and fourth member 38 as shown in FIG. 2. The members 34 and 38 are thus held in a normal, resting, spaced-apart relation. If these two members are either forced together or forced apart about hinge 40, the shock absorption material 42 will resiliently restore members 34 and 38 to their normal resting position as shown in FIG. 2.

Finally, a camera such as a video camera 44 is mounted to the fourth member 38 as with a conventional thumb screw (not shown). In operation, the shock absorption apparatus 10 and 32, which support a camera 44, are attached to the sling mount of a bow with bolt 13. It is also apparent that by modifying the bow mounting plate 12 and camera support member 14, this device could just as well be used with a rifle or other shooting device.

When this device is used with a moving camera or a video camera, the camera mounted to the fourth member 38 is turned on just before aiming the bow. As the archer aims at a target, the camera records the aiming position. When the archer releases the arrow and continues to orient the bow toward the target, it is possible to record the flight of the arrow and the arrow's impact with the target. The shock, created as the archer releases the arrow from the bow, is absorbed both in the horizontal direction and in the vertical direction with the present invention.

The recoil shock force in the generally horizontal plane is transmitted from the bow to the first member 16 and member 16 moves in response to this force. Inertia, on the other hand, holds second member 22 relatively steady. Movement of first member 16 relative to second member 22 stretches the elastic band 26. After the shock force subsides, the elastic band 26 acts to bring first member 16 back into its normal resting position directly under second member 22.

If there are components of the shock force which exist in a generally vertical direction, the device 32 assists in absorbing this shock. When this occurs, the vertical shock force is transmitted through the first and second members 16 and 22 to the third member 34, which member moves with the shock force. Inertia of the camera 44 resting on the fourth member 38 acts to extend or compress the resilient shock absorption material 42 in a corresponding fashion while maintaining the vertical orientation of the camera 44 intact. As this shock force subsides, the shock absorption material 42 resiliently acts to restore the fourth member 38 to its normal resting position above the third member 34.

It can be appreciated that this dual shock absorption device absorbs shock in the horizontal plane as well as in the vertical plane and acts to stabilize the camera 44 to compensate for the recoil existing when an arrow is shot from a bow.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims:

I claim:

1. Shooting apparatus comprising:
   a shooting device for shooting a projectile in a shooting direction;
   a camera;
   shock absorption apparatus for absorbing shock in a generally horizontal plane when the shooting device is being used;
   the apparatus being mounted to the shooting device for supporting the camera, the shock absorption apparatus including a first member having a flat surface and a second member having a flat surface;
   the flat surface of the first member being positioned in mating and abutting relationship to the flat surface of the second member;
   the shock absorption apparatus further including a resilient means for resiliently holding the flat surface of the first member in a facing and abutting position relative to the flat surface of the second member, whereby the two flat surfaces are parallel to a mating plane and slidable in all directions parallel to the mating plane;
   a camera mounting means for mounting the camera to the second member of the shock absorption apparatus; and
   a bow mounting means for rigidly mounting the first member of the shock absorption apparatus to the bow.

2. The apparatus according to claim 1 wherein the resilient means includes an elastic band positioned to extend outside and around at least a portion of the first member and second member and to encase the two flat surfaces abutting one another, the apparatus further including a first clamping means for clamping the elastic band to the first member and a second clamping means for clamping the elastic band to the second member.

3. The apparatus according to claim 2 wherein the first and second clamping means are "O" rings.

4. The apparatus according to claim 1 wherein the camera mounting means for mounting the camera to the second member includes a third member mounted to the second member and a fourth member rigidly mounted to the camera, the camera mounting means further including hinge means having a hinge axis for hingedly connecting the third member to the fourth member, the hinge axis of the hinge being approximately parallel to the mating plane, the fourth member having an "L" shape with one leg secured to the hinge and the other leg being folded over the third member, the means for mounting the camera to the second member further including resilient means positioned between the third and fourth members for resiliently holding the fourth member at a normal, spaced apart, rest position relative to the third member.

5. The apparatus according to claim 4 wherein the resilient means positioned between the third and fourth members comprises foam rubber.

6. Shooting apparatus comprising:
a shooting device for shooting a projectile in a shooting direction;
a camera;
shock absorption apparatus for absorbing shock in a generally vertical direction when the shooting device is being used;
the shock absorption apparatus connecting the camera to the shooting device;
the shock absorption apparatus including a planar member positioned in a generally horizontal plane which planar member is connected to the shooting device and further including an "L" shaped member on which the camera is rigidly mounted, and a hinge means for hingedly connecting one leg of the "L" shaped member to the planar member; the hinge having a hinge axis extending in a generally horizontal direction;
the other leg of the "L" shaped member being folded over the planar member with the hinge; and
further including resilient means positioned between the planar member and the "L" shaped member for resiliently holding these two members at a normal, spaced-apart, rest position relative to one another.

* * * * *